(No Model.) 2 Sheets—Sheet 1.

J. W. PARSONS.
COMBINED HARROW AND COTTON CHOPPER.

No. 245,210. Patented Aug. 2, 1881.

Witnesses:
J. W. Garner
W. S. D. Haines

Inventor:
J. W. Parsons
By H. J. Ennis
Atty.

(No Model.) 2 Sheets—Sheet 2.

J. W. PARSONS.
COMBINED HARROW AND COTTON CHOPPER.

No. 245,210. Patented Aug. 2, 1881.

Witnesses:
Jas. L. Falby
E. H. Bradford

Inventor:
J. W. Parsons
By H. J. Ennis
atty

UNITED STATES PATENT OFFICE.

JOHN W. PARSONS, OF ALCORN COUNTY, MISSISSIPPI.

COMBINED HARROW AND COTTON-CHOPPER.

SPECIFICATION forming part of Letters Patent No. 245,210, dated August 2, 1881.

Application filed May 25, 1881. (No model.)

*To all whom it may concern:*

Be it known that I, JOHN W. PARSONS, a citizen of the United States, residing in the county of Alcorn and State of Mississippi, have invented certain new and useful Improvements in Combined Harrow and Cotton-Chopper; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
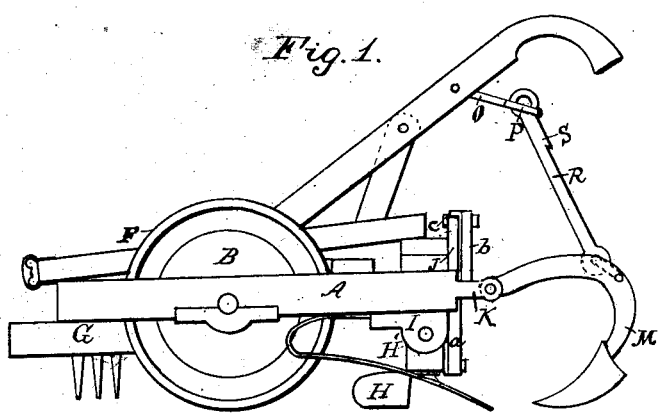
Figure 2:
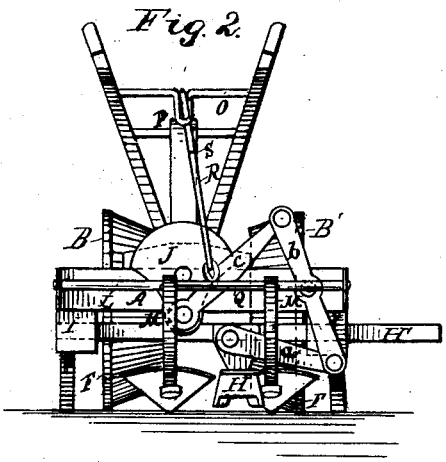
Figure 3:
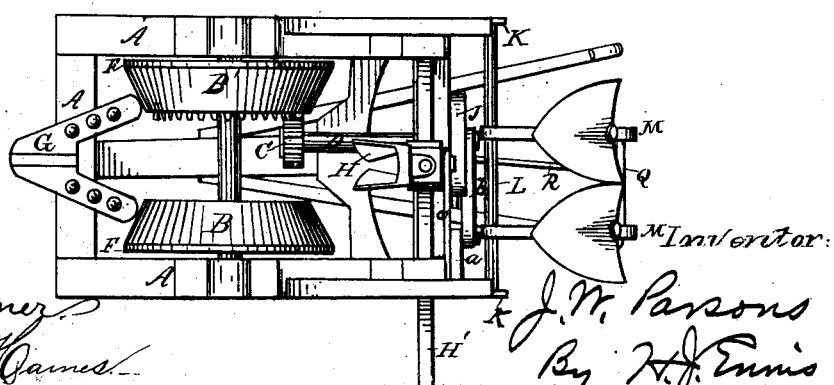
Figure 4:
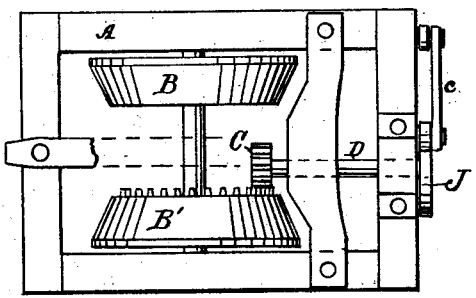
Figure 5:
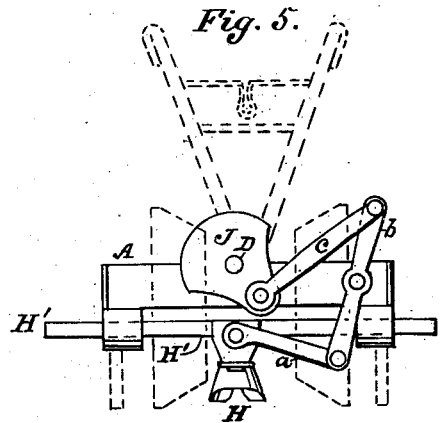

Figure 1 is a side elevation of my improved harrow and cotton-chopper. Fig. 2 is a rear elevation, and Fig. 3 is a bottom-plan view. Figs. 4 and 5 are partial views, in plan and rear, illustrating the chopping mechanism.

This invention has relation to combined harrows and cotton-choppers; and it consists in the improved features of construction and combination hereinafter fully described, and particularly pointed out in the claim.

Referring to the accompanying drawings, A designates the main frame of the machine, which frame is rectangular in form.

B B' designate the supporting-wheels, the wheel B' being geared on its inner face to connect with a spur-wheel, C, on the shaft D to operate the chopper H. These wheels B B' are beveled inwardly, and so cast as to form flanges F, whereby they may be made very light and yet have a broad tread.

The harrow G is triangular in form, and is secured to the main frame on its under side and at the front thereof, and its wings extend back quite close to the wheels B B'. The teeth are so arranged in the harrow-frame that they will pass on each side of the row of plants and harrow the soil at the sides thereof.

The chopper H is suspended from an arm or bar, H', working in boxes or bearings I at the rear end of the frame A, and this bar is given a transverse-reciprocating motion in its bearings or hangers I by means of a compound lever composed of the arms $a$, $b$, and $c$, pivoted together, as shown, and pivoted, also, to a counter-balance, J, on the end of the shaft D. The arm $a$ is pivoted to the reciprocating bar H', and also to the lower end of the arm $b$. The latter is pivoted to one corner of the main frame A, at the rear thereof. The arm $c$ is pivoted to the upper end of the arm $b$, and also to smaller end of the counter-balance J.

Two extensions, K, project from the rear of the frame A, one at each side, and these are perforated to form bearings for a shaft, L, to which the plows M M are secured.

Between the handles N of the machine, and in the rear of the connecting-rod, is a pivoted rod, O, having a spring-loop, P. The standards of the plows are connected by a looped rod, Q, and a hand-lever, R, is connected with this rod Q and has its upper end passed through loop P in the rod O. This hand-lever R is provided with a shoulder or hook, S, by which it may be caused to engage with the loop P and hold the plows in an elevated position when it is unnecessary to use them.

When the machine is in operation the wheel B' imparts motion to the chopper through the shaft B, and reciprocates the chopper transversely at regular intervals, causing the stand to be left uniformly. The harrow cultivates the ground on each side of the row, and the plows following fill the dirt in around the stands.

Having thus fully described my invention, what I claim is—

In a harrow and chopper, the combination, with the driving-wheel B', of the shaft geared thereto and provided with the counter-balance J, the compound lever composed of the arms $a$, $b$, and $c$, and the transversely-reciprocating bar H', provided with the chopper H, substantially as and for the purposes set forth.

In testimony I hereby sign my name in the presence of two witnesses.

JOHN WESLEY PARSONS.

Witnesses:
J. L. McLEAN,
C. R. KERR.